(12) United States Patent
Jane Santamaria

(10) Patent No.: US 10,173,554 B2
(45) Date of Patent: Jan. 8, 2019

(54) STRUCTURE FOR CHILD SAFETY SEATS

(71) Applicant: JANE, S.A., Palau Solità I Plegamans (ES)

(72) Inventor: Manuel Jane Santamaria, Palau Solita I Plegamans (ES)

(73) Assignee: JANE, S.A., Barcelona (ES)

( * ) Notice: Subject to any disclaimer, the term of this patent is extended or adjusted under 35 U.S.C. 154(b) by 0 days.

(21) Appl. No.: 15/613,574

(22) Filed: Jun. 5, 2017

(65) Prior Publication Data
US 2018/0029507 A1 Feb. 1, 2018

(30) Foreign Application Priority Data
Jul. 29, 2016 (ES) .................. 201630984 U

(51) Int. Cl.
*B60N 2/28* (2006.01)
(52) U.S. Cl.
CPC .......... *B60N 2/2821* (2013.01); *B60N 2/2806* (2013.01); *B60N 2/286* (2013.01); *B60N 2/2875* (2013.01); *B60N 2/2884* (2013.01); *B60N 2/2851* (2013.01); *B60N 2/2872* (2013.01); *B60N 2/2881* (2013.01); *B60N 2/2887* (2013.01)
(58) Field of Classification Search
CPC .... B60N 2/2821; B60N 2/2806; B60N 2/286; B60N 2/2875; B60N 2/2884
USPC .................. 297/250.1, 256.16, 253
See application file for complete search history.

(56) References Cited

U.S. PATENT DOCUMENTS

| | | | | |
|---|---|---|---|---|
| 5,265,931 A * | 11/1993 | Ryan | ........................ | A47D 1/06 297/250.1 |
| 5,466,044 A * | 11/1995 | Barley | ................. | B60N 2/2821 297/253 X |
| 5,524,965 A * | 6/1996 | Barley | ................. | B60N 2/2827 297/256.16 X |
| 7,246,853 B2 * | 7/2007 | Harcourt | .............. | B60N 2/2812 297/256.16 |
| 7,984,947 B2 * | 7/2011 | Pos | ...................... | B60N 2/2821 297/256.16 |

* cited by examiner

*Primary Examiner* — Anthony D Barfield
(74) *Attorney, Agent, or Firm* — Dowell & Dowell, P.C.

(57) ABSTRACT

The present invention relates to a special structure for child safety seats intended to be used in motor vehicles that significantly reinforces them in order to resist, with greater guarantees, the crash or collision to which vehicles are exposed, both in the event of colliding with another vehicle and in the event of colliding with a certain obstacle.

This new and advantageous structure for child safety seats comprises a seat rest, a backrest, two sides and a headrest, formed by a rigid frame. More specifically, it basically comprises a base frame, a backwards frame tilted joined at the bottom to the front part of the base frame and a vertical support solidly connected to the base frame and to the tilted frame, whose frame receives the coupling of components that constitute the support of the constituent parts of the seat, such as the base, sides and headrest, whose parts are formed from blocks of pressure-absorbing lightweight material.

6 Claims, 9 Drawing Sheets

STRUCTURE FOR CHILD SAFETY SEATS

OBJECT OF THE INVENTION

Structure for child safety seats.

FIELD OF THE INVENTION

This structure is mainly intended for child safety seats used in motor vehicles.

BACKGROUND OF THE INVENTION

Various child safety seat models are known, generally manufactured from injected or moulded plastic material, forming one-piece or two-piece frame, the latter forming the seat and backrest which are usually articulate there between. However, these constitutions known in the market are not sufficiently resistant in the event of a major collision or crash.

SUMMARY OF THE INVENTION

The object of this invention is a special structure for child safety seats intended to be used in motor vehicles that significantly reinforces them in order to resist, with greater guarantees, the crash or collision to which vehicles are exposed, both in the event of colliding with another vehicle and in the event of colliding with a certain obstacle.

This new and advantageous structure for child safety seats significantly reinforces the three parts that generally make up this type of child safety seats, i.e. the seat, the backrest and the sides.

To this end, the structure for child safety seats basically comprises a rigid frame, advantageously having a metallic constitution, having a base frame corresponding to the seat, a tilted frame corresponding to the sides and a vertical support corresponding to the backrest.

This frame is supplemented by the coupling of components that constitute the support for the constituent parts of the seat, such as its base, the sides and the headrest, whose parts are formed from blocks of lightweight material with shock- and shake-absorbing power.

The aforementioned components that support the sides and headrest of the seat consist of angular plates that are installed in a vertically sliding arrangement and those corresponding to the sides, also with possibility of side movement.

These and other characteristics will be better inferred from the following detailed description, which for better understanding thereof is accompanied by nine drawings wherein a practical embodiment mentioned only by way of non-limiting example of the scope of the present invention has been represented.

DETAILED DESCRIPTION OF A PREFERRED EMBODIMENT OF THE INVENTION

In accordance with the attached drawings, the advocated structure for child safety seats comprises a rigid frame 1 basically presenting a base frame 2, a frame 3 tilted backwards joined at the bottom to the front part of the base frame 2 and a vertical support 4 solidly connected to the base frame 2 and to the tilted frame 3.

Figure 1:
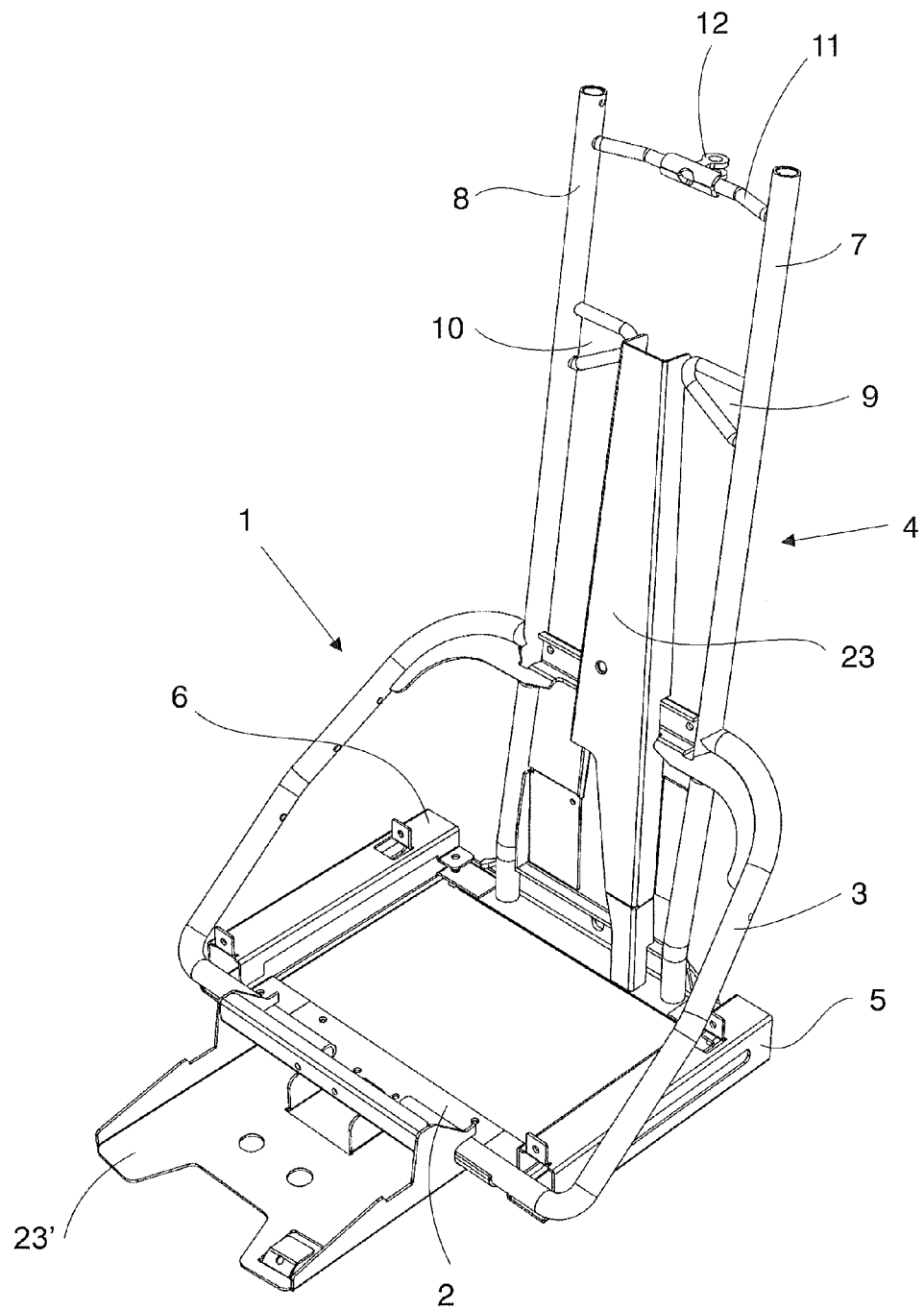
FIGS. 1, 2 and 3 illustrate perspective, front elevational and side elevational views, respectively, of the basic structure for child safety seats.
Figure 2:
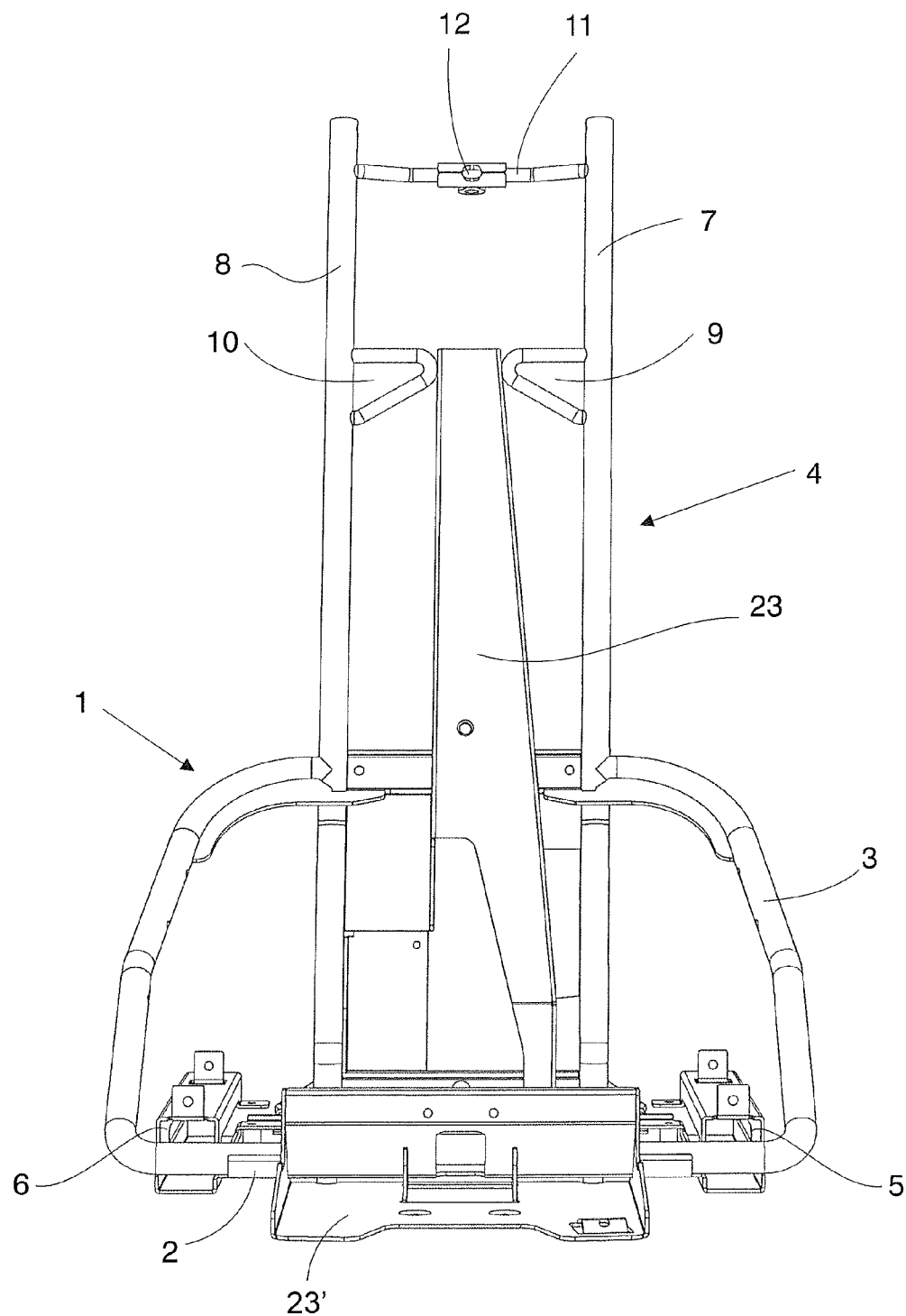
Figure 3:
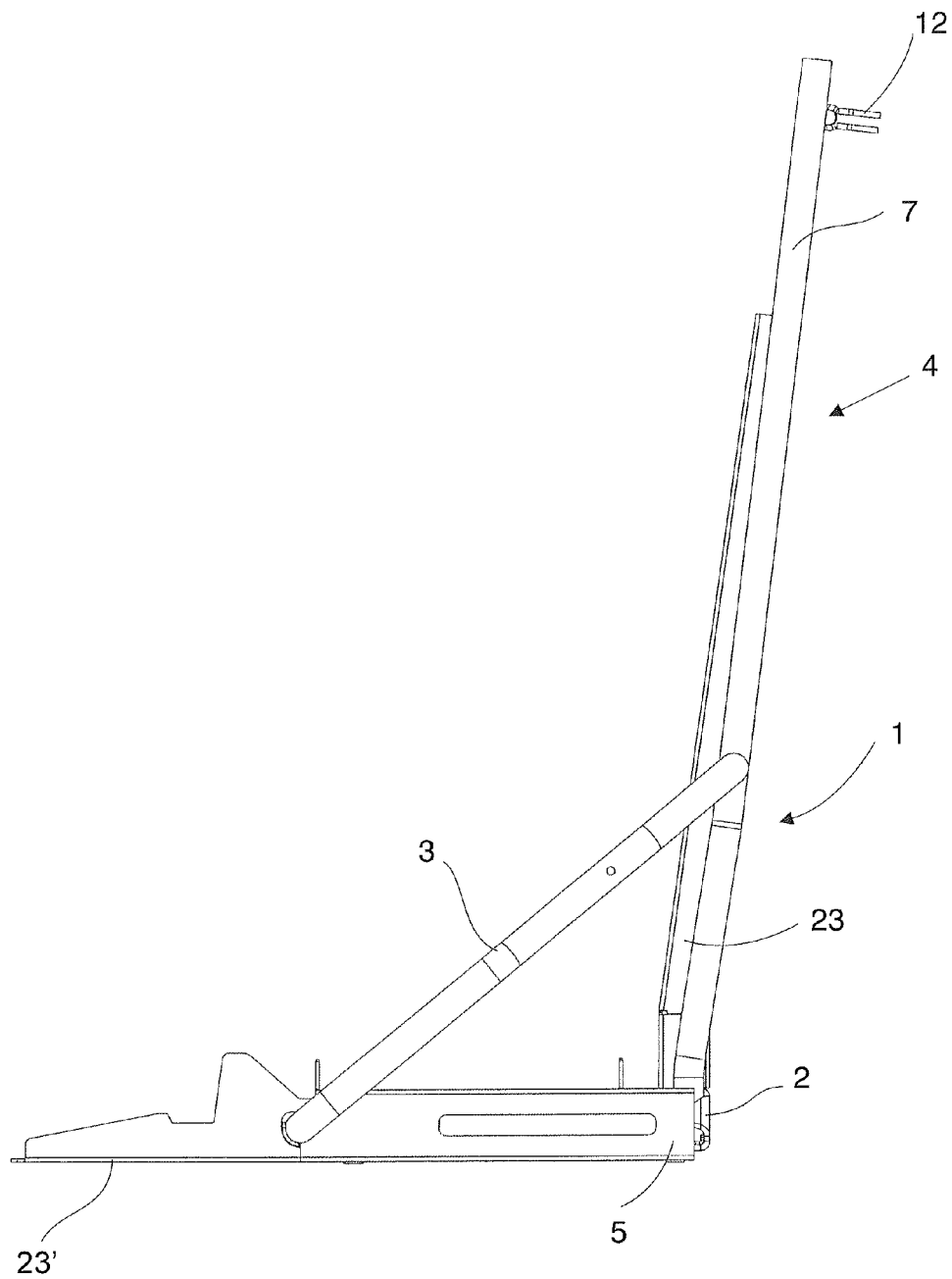
Figure 4:
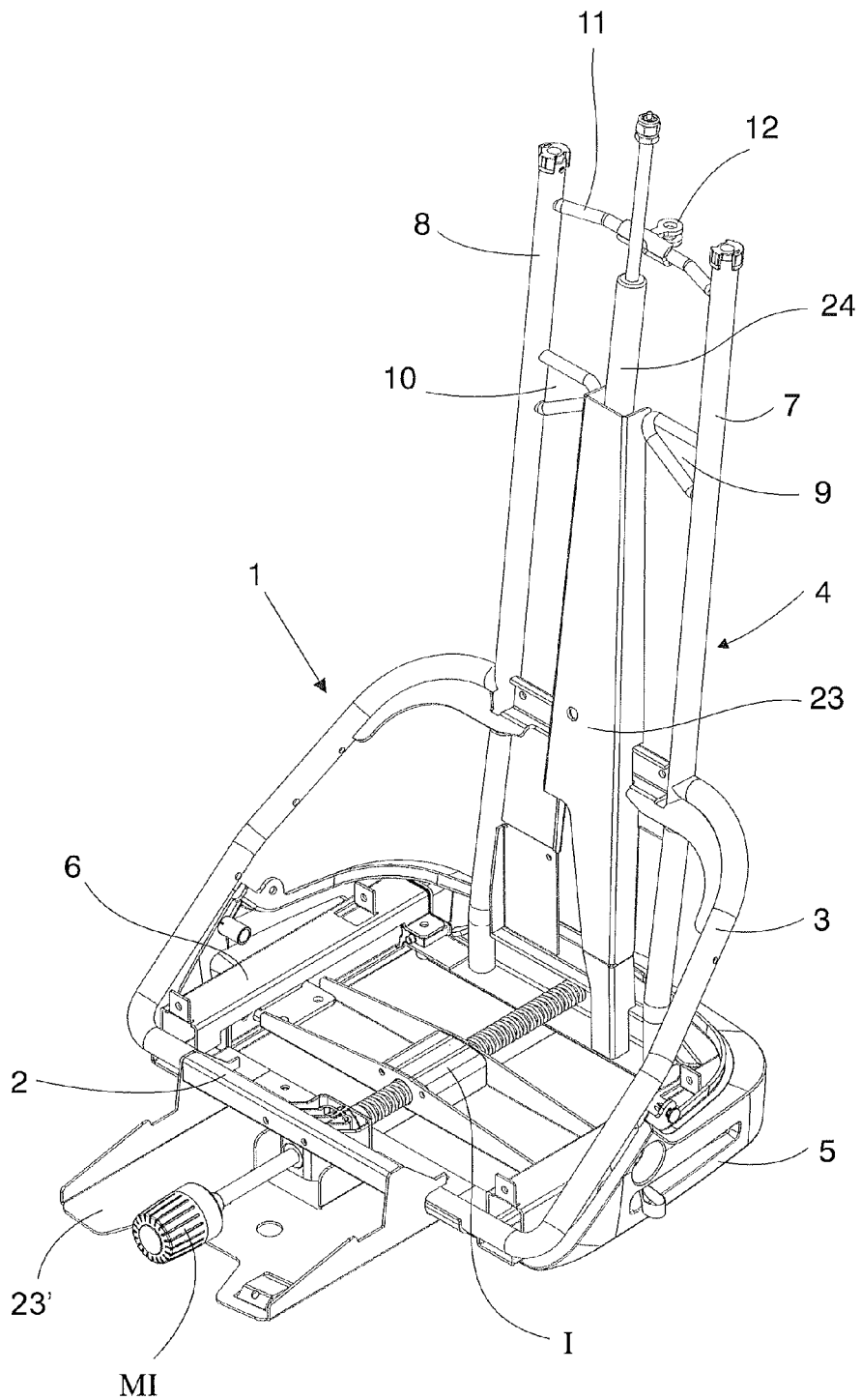
FIG. 4 shows a perspective view of the basic structure to which the Isofix vehicle coupling mechanism has been incorporated.

The base frame 2 comprises two sides 5 and 6, which constitute the guides for the movement of the Isofix mechanism I (FIG. 4), for coupling the seat S to the car, and the vertical support 4 is formed by two columns 7 and 8 parallel there between, presenting corresponding guides 9 and 10 for the safety straps for strapping the child into the seat and which are joined by means of an upper cross member 11 provided with means 12 for fastening the upper fixation strap of the seat S to the car.

The frame 1 receives the coupling of various components that constitute the support of the constituent parts of the seat, such as sides and headrest, which consist of angular plates installed in a vertically sliding arrangement, wherein said angular plate 13 corresponding to the headrest has a U-shaped constitution and the angular plates corresponding to the sides are formed by corresponding angular pieces 14 and 15, which are installed with the possibility of side movement, such that the headrest and sides may be raised as the child grows and, additionally, the sides can also become detached in accordance with the child's growth. In this case, the vehicle's safety belt is used, which passes through the guides 13' or 13" provided underneath the headrest 20.

Figure 8:
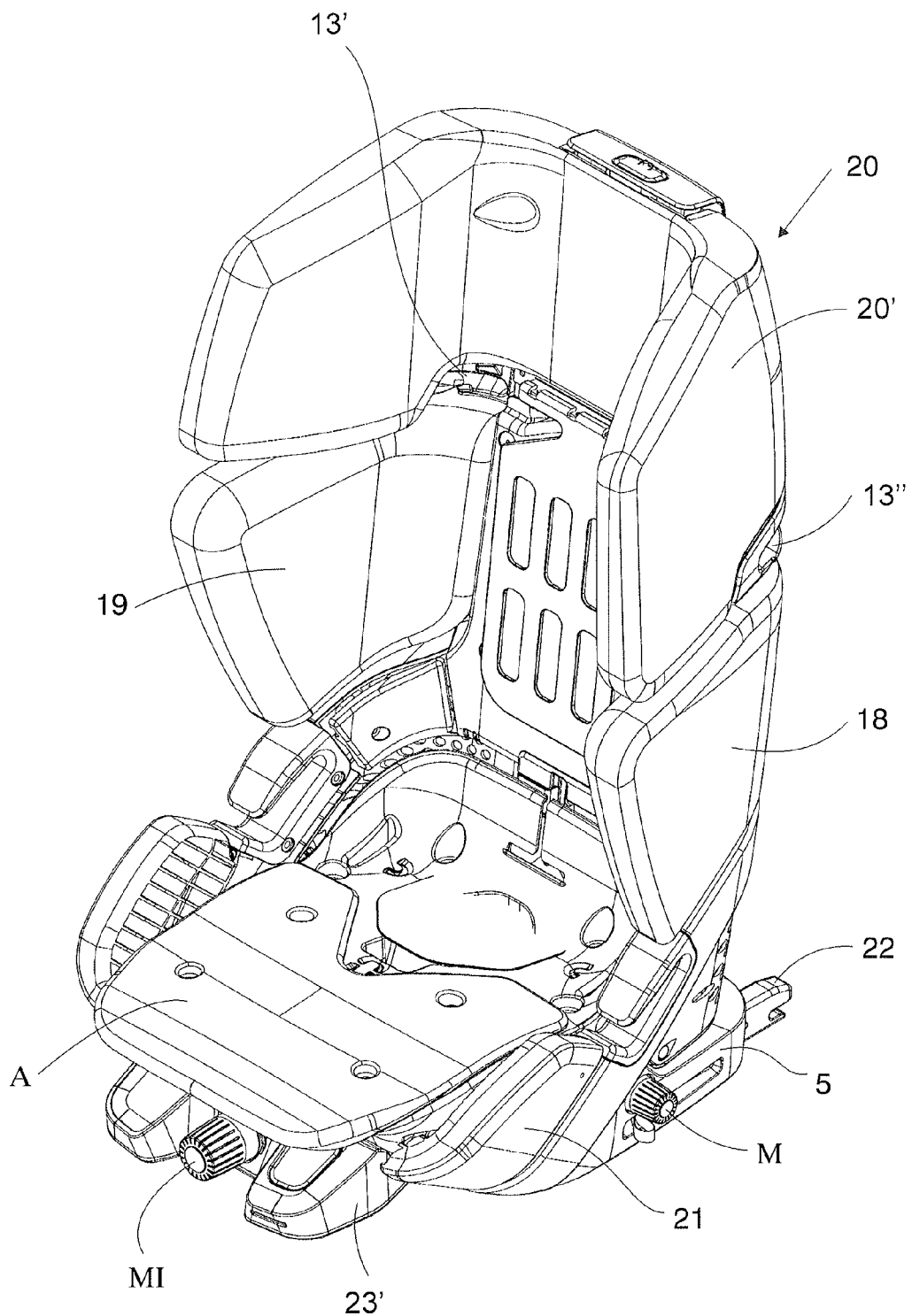
FIG. 8 illustrates a perspective view of the structure already provided with the blocks of lightweight material that constitute the base, the sides and the headrest.
Figure 9:
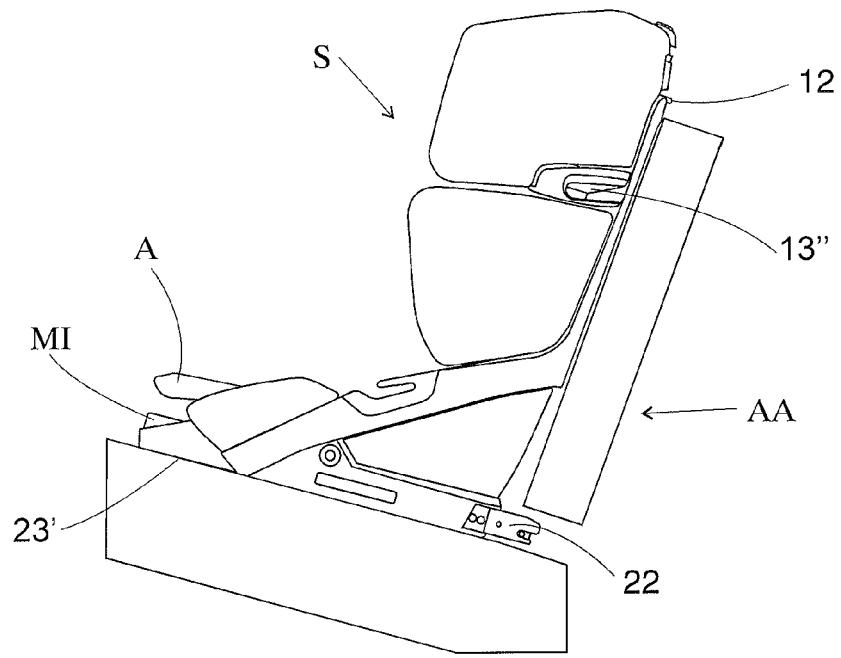
FIGS. 9 and 10 show schematic side elevational views of the disposition of the child safety seat on the seat of a vehicle, in normal and tilted positions, respectively.
Figure 10:
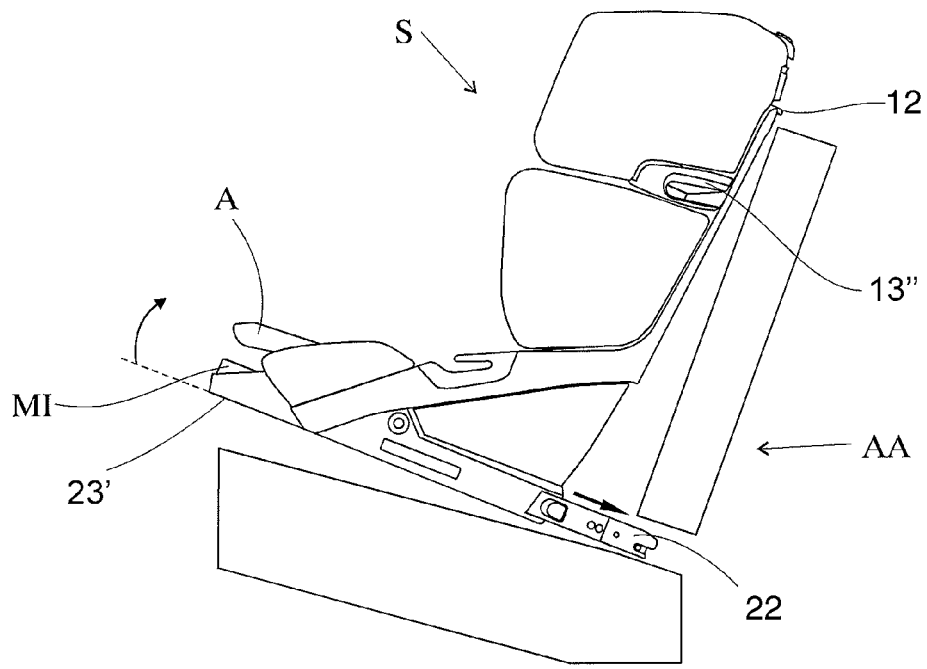

With regard to the constituent parts of the seat, such as the base, sides and headrest, they will preferably be formed by blocks of pressure- and impact-absorbing power lightweight material 18, 19, 20' and 21 such as, for example, EVA foam, which is easy to mould and comfortable for the child (FIG. 8).

Figure 5:
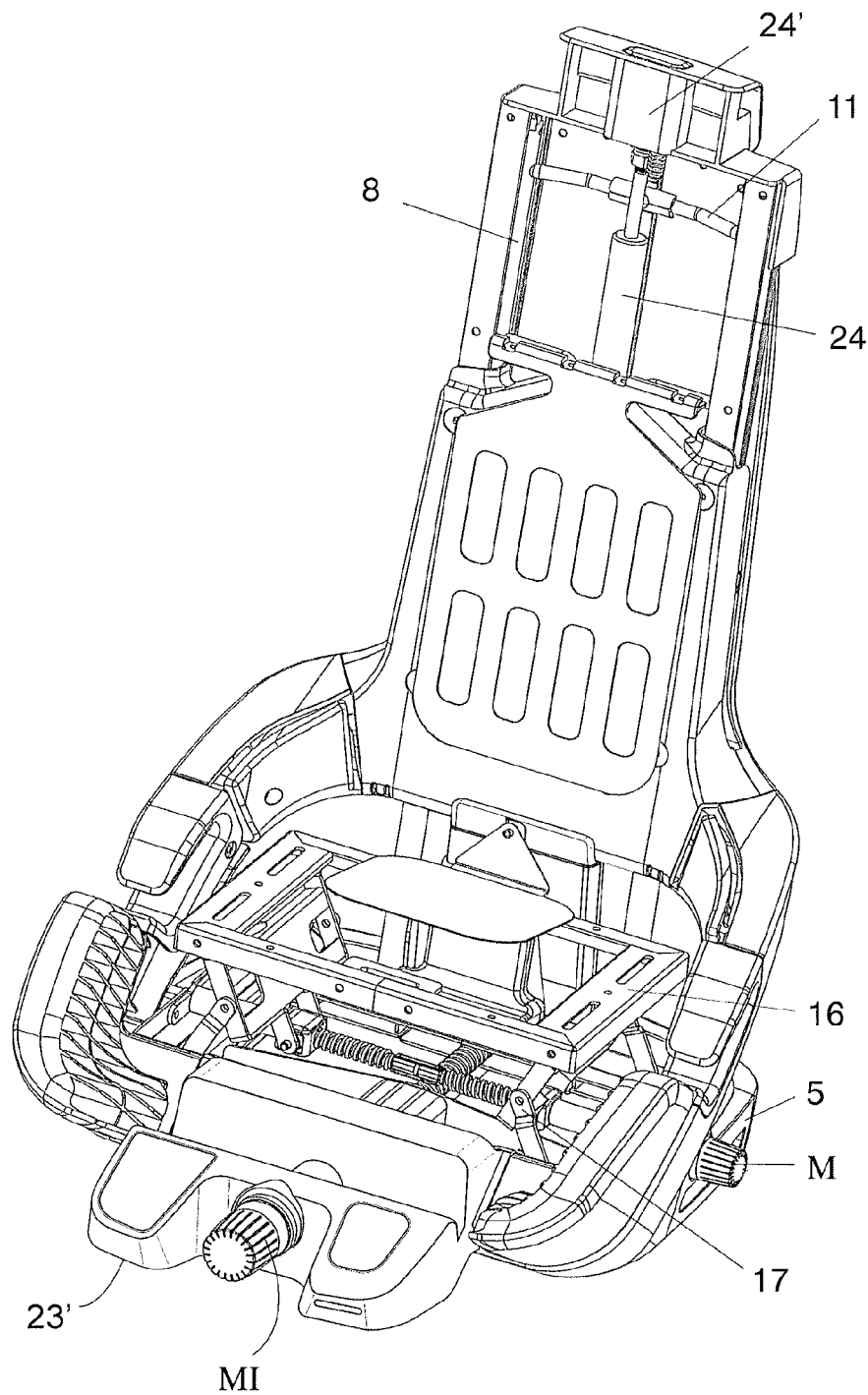
FIG. 5 represents a perspective view of the basic structure supplemented by the incorporation of the mechanism that determines the vertical movement of the seat rest.
Figure 6:
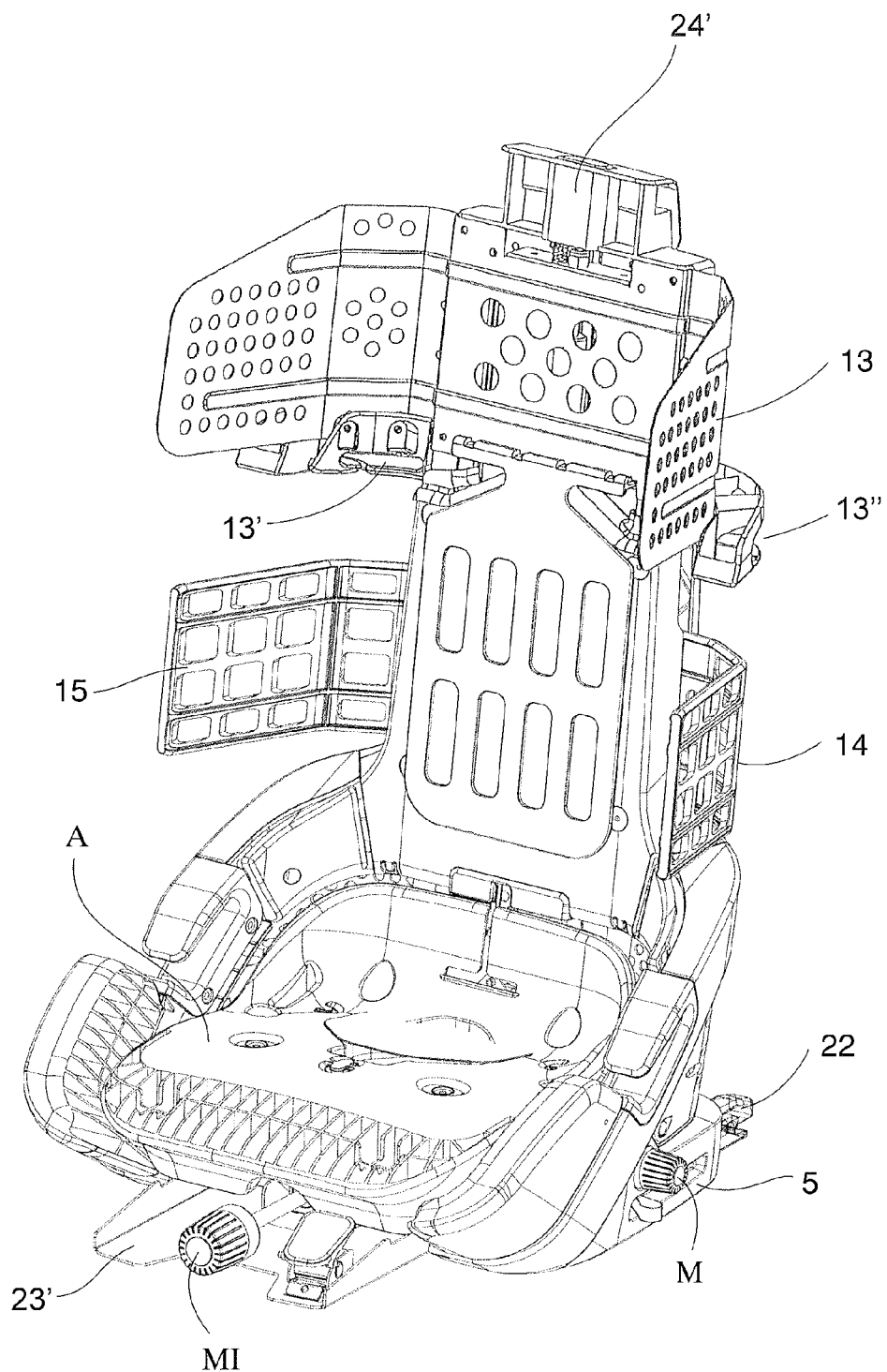
FIGS. 6 and 7 point out front and rear perspective views of the structure, with the incorporation of the supporting components of the sides and headrest in lowered and raised positions, respectively.
Figure 7:
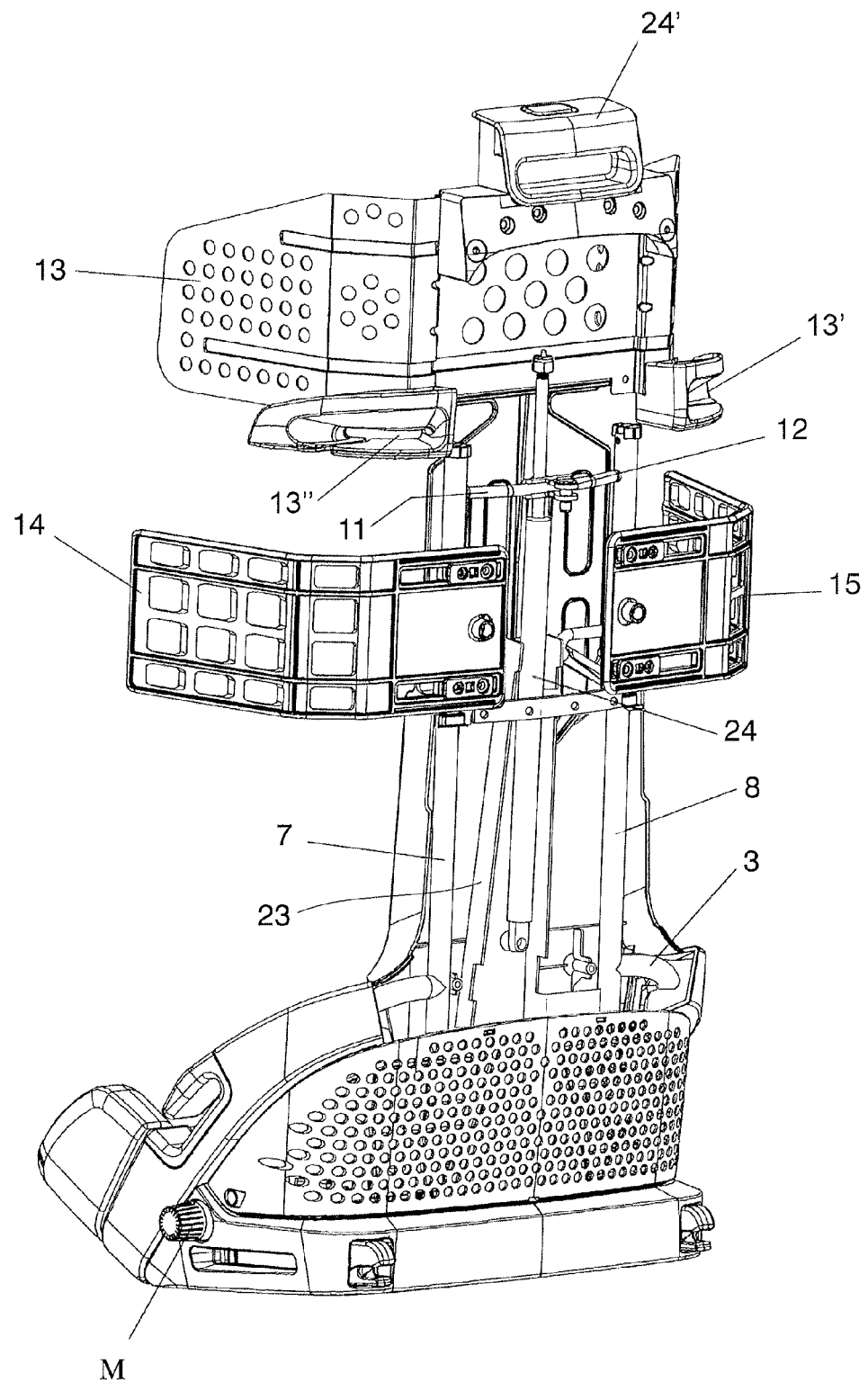

The child safety seat rest R is supported by a frame 16 mounted on a mechanism 17 through which its vertical movement is determined upon actuating the side controller C (FIG. 5).

The tilted frame 3 is related, by its upper section, to the rear section of the base frame 2 by a grooved vertical support 23, from which a pneumatic cylinder 24 associated with the headrest support 24' by the top thereof projects.

Since it is a rigid constitution child safety seat, in order to tilt it, when the seat S is disposed on the vehicle seat VS the controller IC of the Isofix mechanism must be actuated, making the anchoring ends 22 subsequently project, rotating the child safety seat S around the upper anchoring point 12 of the car seat and determining the height of the front part of the seat S, with the ensuing inclination thereof.

The invention, in its essentiality, can be put into practice in other embodiments that only differ in detail from the embodiment indicated by way of example, which will also fall under the scope of protection applied for.

Therefore, this structure may be manufactured for child safety seats in any shape and size, using the most adequate means and materials and with the most convenient accessories, wherein the elements it is composed of may be replaced by other, technically equivalent ones, due to being wholly comprised within the nature of the claims.

The invention claimed is:

1. A structure for child safety seats comprising a seat rest, a backrest, two sides and a headrest, the structure comprising:
   a rigid frame comprising a base frame, a backwards frame tilted joined at the bottom to the front part of the base frame and a vertical support solidly connected to the base frame and to the tilted frame, wherein the rigid frame receives the coupling of components that constitute the support of the constituent parts of the seat, including the base, the sides and the lateral headrest of the seat, whose parts are formed from blocks of pressure-absorbing lightweight material,
   wherein the components that constitute the support of the sides and of the headrest consist of angular plates installed in a vertically sliding arrangement, wherein the angular plate corresponding to the headrest presents a U-shaped constitution and the angular plates corresponding to the sides are formed from corresponding angular pieces, which are installed with the possibility of side movement.

2. The structure for child safety seats according to claim 1, wherein the base frame comprises first and second sides constituting guides for the movement of an Isofix mechanism that fastens the seat to the car.

3. The structure for child safety seats according to claim 1, wherein the tilted frame is related to the rear section of the base frame by its upper frame by means of a grooved vertical support, from which a pneumatic cylinder projects that is associated at the top to the headrest support; and wherein the base frame has a front platform.

4. The structure for child safety seats according to claim 1, wherein the seat rest is supported by a frame mounted on a mechanism, which determines its vertical movement.

5. The structure for child safety seats according to claim 1, wherein, once the seat is installed on the vehicle seat, the seat is tilted by actuating an Isofix mechanism, making the ends of the anchoring of said mechanism protrude.

6. The structure for child safety seats according to claim 1, wherein the vertical support is formed by two columns parallel between them, presenting corresponding guides for safety straps for strapping the child into the seat and which are joined by means of an upper cross member having means for fastening the upper fixation strap of the seat to the car.

* * * * *